(12) United States Patent
Yang et al.

(10) Patent No.: US 8,802,805 B2
(45) Date of Patent: Aug. 12, 2014

(54) PROCESS FOR PREPARING SHELF-STABLE CURABLE POLYSILAZANES, AND POLYSILAZANES PREPARED THEREBY

(75) Inventors: Yu Yang, Eden Prairie, MN (US); George G. I. Moore, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 13/515,333

(22) PCT Filed: Dec. 16, 2010

(86) PCT No.: PCT/US2010/060781
§ 371 (c)(1),
(2), (4) Date: Aug. 6, 2012

(87) PCT Pub. No.: WO2011/079020
PCT Pub. Date: Jun. 30, 2011

(65) Prior Publication Data
US 2013/0178595 A1    Jul. 11, 2013

Related U.S. Application Data

(60) Provisional application No. 61/289,101, filed on Dec. 22, 2009.

(51) Int. Cl.
C08G 77/26 (2006.01)
C08G 77/62 (2006.01)

(52) U.S. Cl.
CPC .................................. C08G 77/62 (2013.01)
USPC .......................................................... 528/28

(58) Field of Classification Search
USPC .......................................................... 528/28
See application file for complete search history.

(56) References Cited

U.S. PATENT DOCUMENTS

| | | |
|---|---|---|
| 2,823,218 A | 2/1958 | Speier |
| 2,970,150 A | 1/1961 | Bailey |
| 3,159,601 A | 12/1964 | Ashby |
| 3,159,662 A | 12/1964 | Ashby |
| 3,220,972 A | 11/1965 | Lamoreaux |
| 3,250,808 A | 5/1966 | Moore |
| 3,516,946 A | 6/1970 | Modic |
| 3,814,730 A | 6/1974 | Karstedt |
| 4,029,629 A | 6/1977 | Jeram |
| 4,504,645 A | 3/1985 | Melancon |
| 4,510,094 A | 4/1985 | Drahnak |
| 4,530,879 A | 7/1985 | Drahnak |
| 4,533,575 A | 8/1985 | Melancon |
| 4,659,850 A | 4/1987 | Arai |
| 4,840,778 A | 6/1989 | Arai |
| 4,845,268 A | 7/1989 | Ohsaka |
| 4,904,417 A | 2/1990 | Ohsaka |
| 4,929,704 A | 5/1990 | Schwark |
| 4,952,715 A | 8/1990 | Blum |
| 5,001,090 A | 3/1991 | Schwark |
| 5,021,533 A | 6/1991 | Schwark |
| 5,032,649 A | 7/1991 | Schwark |
| 5,145,886 A | 9/1992 | Oxman |
| 5,206,327 A | 4/1993 | Matsumoto |
| 5,344,907 A | 9/1994 | Schwark |
| 5,354,922 A | 10/1994 | Marchionni |
| 5,386,006 A | 1/1995 | Matsumoto |
| 5,464,918 A | 11/1995 | Schwark |
| 5,520,978 A | 5/1996 | Boardman |
| 5,558,908 A | 9/1996 | Lukacs |
| 5,616,650 A | 4/1997 | Becker |
| 5,637,641 A | 6/1997 | Becker |
| 5,741,552 A | 4/1998 | Takayama |
| 5,747,623 A | 5/1998 | Matsuo |
| 5,843,526 A | 12/1998 | Lukacs |
| 5,905,130 A | 5/1999 | Nakahara |
| 5,922,411 A | 7/1999 | Shimizu |
| 6,165,551 A | 12/2000 | Lukacs |
| 6,329,487 B1 | 12/2001 | Abel |
| 6,534,184 B2 | 3/2003 | Knasiak |

(Continued)

FOREIGN PATENT DOCUMENTS

| | | |
|---|---|---|
| EP | 0332374 | 9/1989 |
| EP | 0424279 | 4/1991 |
| JP | H0331326 | 2/1991 |
| JP | 03/290437 | 12/1991 |
| JP | 07/196987 | 8/1995 |
| WO | WO 02/044264 | 6/2002 |
| WO | WO 2004/039904 | 5/2004 |
| WO | WO 2011/002666 | 1/2011 |
| WO | WO 2011/002668 | 1/2011 |

OTHER PUBLICATIONS

Bauer et al., "Preparation of moisture curable polysilazane coatings Part I. Elucidation of low temperature curing kinetics by FT-IR spectroscopy", Progress in Organic Coatings 53, 183-190 (2005).
Campbell-Ferguson et al., "Adducts Formed between Some Halogenosilanes and the Organic Bases Pyridine, Trimethylamine, and Tetramethylethylenediamine. Part I. Stoicheiometry", J. Chem. Soc. (A), 1966, 1508-1514 (1966).

(Continued)

Primary Examiner — Kuo-Liang Peng
(74) Attorney, Agent, or Firm — Lucy C. Weiss

(57) ABSTRACT

A process for preparing curable oligomeric and/or polymeric polysilazanes comprises (a) forming at least one dihalosilane-base adduct by reacting at least one dihalosilane with at least one base; (b) optionally, combining at least one dihalosilane-base adduct and at least one organodihalosilane; and (c) carrying out ammonolysis of at least one dihalosilane-base adduct or of the resulting combination of at least one dihalosilane-base adduct and at least one organodihalosilane; with the proviso that the base (1) is used for the dihalosilane-base adduct formation in a limited amount that is less than or equal to twice the stoichiometric amount of silicon-halogen bonds in the dihalosilane or (2) is used for the dihalosilane-base adduct formation in excess of this limited amount and, prior to the ammonolysis, the total amount of the resulting reacted and unreacted base is reduced to no more than this limited amount.

21 Claims, No Drawings

(56) References Cited

U.S. PATENT DOCUMENTS

| | | |
|---|---|---|
| 6,652,978 B2 | 11/2003 | Lukacs, III |
| 6,664,354 B2 | 12/2003 | Savu |
| 6,756,469 B2 | 6/2004 | Lukacs, III |
| 7,294,731 B1 | 11/2007 | Flynn |
| 7,335,786 B1 | 2/2008 | Iyer |
| 7,345,123 B2 | 3/2008 | Qiu |
| 2002/0105728 A1 | 8/2002 | Yamaguchi |
| 2003/0013923 A1 | 1/2003 | Marchionni |
| 2005/0054804 A1 | 3/2005 | Dams |
| 2005/0250921 A1 | 11/2005 | Qiu |
| 2005/0279255 A1 | 12/2005 | Suzuki |
| 2006/0246221 A1 | 11/2006 | Falk |
| 2007/0254975 A1 | 11/2007 | Arney |
| 2008/0220264 A1 | 9/2008 | Iyer |
| 2010/0015453 A1 | 1/2010 | Yamaguchi |
| 2010/0331487 A1 | 12/2010 | Yang |
| 2010/0331498 A1 | 12/2010 | Yang |
| 2012/0192761 A1 | 8/2012 | Hara et al. |

OTHER PUBLICATIONS

Kubo et al., "Preparation of Hot Water-Resistant Silica Thin Films from Polysilazane Solution at Room Temperature," Journal of Sol-Gel Science and Technology 31, 257-261 (2004).

Seyferth et al., "A Liquid Silazane Precursor to Silicon Nitride", Communications of the American Ceramic Society, pp. C-13 and C-14, Jan. 1983.

Vu et al., "Advanced Coating Materials Based on Polysilazanes," paper presented at The Nurnberg Congress, European Coating Show 2007, May 7, 2007.

International Search Report, PCT/US2010/060781, International Filing Date Dec. 16, 2010.

PROCESS FOR PREPARING SHELF-STABLE CURABLE POLYSILAZANES, AND POLYSILAZANES PREPARED THEREBY

STATEMENT OF PRIORITY

This application claims the priority of U.S. Provisional Application No. 61/289,101, filed Dec. 22, 2009, the contents of which are hereby incorporated by reference.

FIELD

This invention relates to processes for preparing curable polysilazane-containing compositions and, in another aspect, to compositions prepared thereby.

BACKGROUND

Ceramic materials are well-known and widely used for different applications due to some of their exceptional properties, such as relatively high modulus, hardness, high temperature stability, and/or chemical resistance. Ceramic materials can also be, however, relatively heavy, brittle, and/or difficult to process. Alternatively, organic polymers can be relatively tough, flexible, light, and/or easy to fabricate and process, but their relatively low moduli and relatively low decomposition temperatures prevent their use in some applications. Pre-ceramic polymer technology is emerging as a promising approach for producing materials that share the advantages of both polymers and ceramics, while minimizing the disadvantages.

Mixed organic/inorganic polymer compositions have been prepared (for example, by the hydrolysis of tetraalkoxysilanes containing polymerizable organic groups) to circumvent the insolubility of many important engineering polymers within sol-gel solutions. Curing of such sol-gel processed monomers has provided mixed systems exhibiting some of the properties of the organic components, as well as some of the properties of the inorganic components. Such mixed systems have typically comprised semi-interpenetrating networks composed of linear organic polymers and a three-dimensional silicon dioxide network.

Many polymers are known to act as ceramic precursors, and their use for production of ceramic structures has been reported. Polysilazanes and modified polysilazanes (for example, isocyanate-modified, isothiocyanate-modified, thiourea-modified, boron-modified, peroxide-modified, and amide-modified) have been prepared and used for pyrolytic conversion to a ceramic material (for example, silicon nitride). Polysilazanes have also been used to modify materials such as epoxy resins, phenolic resins, and polyamines.

Hybrid organic/inorganic polymers or ceramers (including hybrid polysilazane polymers or ceramers) have been prepared by the reaction of organic electrophiles with metal-containing polymers. The hybrid polymers are said to comprise organic segments derived from the organic electrophiles and inorganic fractions derived from segments of the metal-containing polymers. Such hybrid polymers have been proposed for use as coatings on substrate materials, for molding applications (with or without fillers), and for other polymer applications in which their hybrid properties (for example, a combination of relatively high mechanical strength and high temperature stability) can be advantageous.

Curable perhydropolysilazane (inorganic homopolymer) and curable polyorganosilazanes (homopolymers or copolymers composed of organo-modified silazane units) have been prepared by ammonolysis of various dihalosilanes and organodihalosilanes, respectively. In addition, one example of a curable copolysilazane (hybrid organic/inorganic copolymer, with only a portion of its silazane units being organo-modified silazane units) has been prepared by ammonolysis of a combination of dichlorosilane and methyl dichlorosilane.

Such curable polysilazanes can have main chains or backbones that comprise structural units having the following general formula:

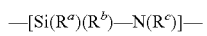

—[Si($R^a$)($R^b$)—N($R^c$)]—     Formula I wherein each $R^a$, each $R^b$, and each $R^c$ is independently hydrogen, an organic group, a heteroorganic group, or a combination thereof. In perhydropolysilazane, all of $R^a$, $R^b$, and $R^c$ in Formula I above are hydrogen, and, in the other polysilazanes, at least one of $R^a$ and $R^b$ is a group other than hydrogen for a portion (copolysilazane) or all (polyorganosilazanes) of the structural units.

In spite of the numerous drawbacks of pyridine use (for example, relatively high odor, cost, hydrophilicity, and boiling point), the methods of preparing the perhydropolysilazane and the copolysilazane typically have involved the use of relatively large excess amounts of pyridine (for example, at least about 12 times the stoichiometric amount of silicon-halogen bonds in the starting silanes). These large excesses have been used to form pyridine adducts of apparently all starting silanes in situ, and the resulting pyridine adducts have then been co-ammonolyzed in the presence of the remainder of the large excess of base.

SUMMARY

Thus, we recognize that there exists an ongoing need for hybrid organic/inorganic polymers or ceramers (and, in particular, hybrid polysilazane polymers or ceramers) that can meet the performance requirements of a variety of different applications (especially coating applications) and for efficient and cost-effective processes for their preparation. Such processes will preferably be capable of flexibly and controllably producing polymers having tailored structures and physical properties.

Briefly, in one aspect, this invention provides a process for preparing curable oligomeric and/or polymeric polysilazanes comprising
(a) forming at least one dihalosilane-base adduct by reacting at least one dihalosilane with at least one base;
(b) optionally, combining at least one dihalosilane-base adduct and at least one organodihalosilane; and
(c) carrying out ammonolysis of at least one dihalosilane-base adduct or of the resulting combination of at least one dihalosilane-base adduct and at least one organodihalosilane;
with the proviso that the base (1) is used for the dihalosilane-base adduct formation in a limited amount that is less than or equal to twice the stoichiometric amount of silicon-halogen bonds in the dihalosilane or (2) is used for the dihalosilane-base adduct formation in excess of (more than) this limited amount and, prior to the ammonolysis, the total amount of the resulting reacted and unreacted base is reduced to no more than this limited amount (for example, by removal of base by evaporation). The base is preferably used for the dihalosilane-base adduct formation in an amount that is at least equal to the stoichiometric amount of silicon-halogen bonds in the dihalosilane but less than or equal to twice this amount.

Preferably, the dihalosilane is dichlorosilane, the base is pyridine, and/or the ammonolysis is carried out by reaction with ammonia. The organodihalosilane can be selected from monoorganodihalosilanes, diorganodihalosilanes, and combinations thereof.

Optional step (b) of the process is preferably carried out, so as to prepare curable copolysilazane (more preferably, both this step and the ammonolysis step are carried out in the presence of no more than the above-defined limited amount of base). The process can optionally further comprise the use of aprotic (preferably, nonpolar aprotic) solvent (preferably, hexane) and/or the purification, isolation, coating (for example, after optional solvent addition or change), and/or curing of the resulting curable polysilazane.

It has been discovered that by limiting the amount of base that is present during ammonolysis of the dihalosilane-base adduct, curable oligomeric and/or polymeric polysilazanes having relatively low initial viscosities (and, accordingly, relatively long shelf lives even in the absence of solvent (that is, in neat or 100 percent solids form)) can be prepared. The curable polysilazanes surprisingly exhibit significantly improved shelf stability, relative to corresponding polysilazanes prepared by the prior art method that uses much larger amounts of base.

For example, curable polysilazanes (perhydropolysilazane and copolysilazanes) prepared by the process of the invention generally can be stable for periods of about 1 to about 3 days in the absence of solvent (100 percent solids form) or at high concentration in solvent before dilution to avoid gellation can become necessary. Such time periods can be sufficient to enable purification and/or work-up in an industrial setting without the loss of a batch or a kettle due to gellation. Thus, the process of the invention can provide curable polysilazanes that exhibit greater industrial compatibility (relative to corresponding polysilazanes prepared by the typical prior art method described above) and that can be more easily stored and then cured on demand.

In particular, copolysilazanes prepared by the process of the invention provide a versatile class of hybrid organic/inorganic polymers or ceramers that can be cured to form crosslinked networks. The properties of the crosslinked networks can be tailored to the requirements of various different applications by varying the relative amounts of the starting dihalosilane (which determines the degree of inorganic content of the curable polysilazane, affects the curing agents that can be effective, and increases the hardness of the cured polysilazane) and the starting organodihalosilane (which determines the degree of organic content of the curable polysilazane, also affects the curing agents that can be effective, and increases the flexibility of the cured polysilazane).

Unlike at least some physical blends of perhydropolysilazane and polyorganosilazane(s), the copolysilazanes do not exhibit phase separation and can be cured to provide homogeneous, optically clear coatings. The incorporation of only a relatively small portion of organo-modified silazane units (for example, about 10 mole percent) can provide copolysilazanes that can retain the excellent curability and hardness characteristics of perhydropolysilazane, while gaining the benefit of improved flexibility (and therefore reduced crack formation in the cured coating).

The process of the invention can be carried out with less pyridine (a relatively expensive base) than the prior art method and therefore can be relatively more cost-effective. The process also can be relatively more efficient, as the use of less pyridine (which is relatively hydrophilic and boils at a relatively high temperature) can result in less moisture absorption and gellation during polysilazane preparation and can facilitate purification during work-up. The resulting curable polysilazanes can be used in a number of applications including, for example, use in forming coatings or surface treatments, use in molding applications (optionally in combination with at least one filler) to form various shaped articles, use in forming ceramic coatings, and so forth. Thus, at least some embodiments of the process of the invention can meet the above-described, ongoing need for hybrid organic/inorganic polymers or ceramers (and, in particular, hybrid polysilazane polymers or ceramers) that can fulfill the performance requirements of a variety of different applications, as well as the need for efficient and cost-effective preparation processes that can flexibly and controllably produce polymers having tailored structures and physical properties.

In other aspects, this invention also provides a curable polysilazane prepared by the process of the invention, and the curable polysilazane in cured form.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

As used herein, the term "and/or" means one or all of the listed elements or a combination of any two or more of the listed elements.

The words "preferred" and "preferably" refer to embodiments of the invention that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

As used herein, "a," "an," "the," "at least one," and "one or more" are used interchangeably.

The above "Summary of the Invention" section is not intended to describe every embodiment or every implementation of the invention. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

DEFINITIONS

As used in this patent application:

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"cure" means conversion to a crosslinked polymer network (for example, through irradiation or catalysis);

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"fluorochemical" means fluorinated or perfluorinated;

"heteroorganic" means an organic group or moiety (for example, an alkyl or alkylene group) containing at least one heteroatom (preferably, at least one catenated heteroatom);

"oligomer" means a molecule that comprises at least two repeat units and that has a molecular weight less than its entanglement molecular weight; such a molecule, unlike a polymer, exhibits a significant change in properties upon the removal or addition of a single repeat unit;

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine;

"perfluoroether" means a group or moiety having two saturated or unsaturated perfluorocarbon groups (linear, branched, cyclic (preferably, alicyclic), or a combination thereof) linked with an oxygen atom (that is, there is one catenated oxygen atom);

"perfluoropolyether group (or segment or moiety)" means a group or moiety having three or more saturated or unsaturated perfluorocarbon groups (linear, branched, cyclic (preferably, alicyclic), or a combination thereof) linked with oxygen atoms (that is, there are at least two catenated oxygen atoms);

"polysilazane" refers to compounds having at least one of a linear, branched, or cyclic main chain or backbone comprising a plurality of Si—N linkages;

"polysiloxazane" refers to compounds having at least one of a linear, branched, or cyclic main chain or backbone comprising both Si—N and Si—O linkages; for simplicity, in this patent application, "polysilazane" also includes "polysiloxazane" and "polyureasilazane";

"polyureasilazane" refers to compounds having at least one of a linear, branched, or cyclic main chain or backbone comprising a plurality of Si—N linkages and having at least one carbonyl group bonded to each of two nitrogen atoms; and "substituted aryl" group means an aryl group substituted by non-interfering (with cure) atoms such as one or more of halogens, alkyl groups, and heteroalkyl groups.

Silanes

Dihalosilanes that are suitable for use in carrying out the process of the invention include those that can be represented by the general formula $SiH_2X_2$, wherein each X is independently a halogen atom (selected from fluorine, chlorine, bromine, iodine, and combinations thereof; preferably, selected from chlorine, bromine, iodine, and combinations thereof; more preferably, selected from chlorine, bromine, and combinations thereof). Dichlorosilane is most preferred.

Organodihalosilanes that are suitable for use in carrying out the process of the invention include those that can be represented by the general formula $R^a R^b SiX_2$, wherein $R^a$ and $R^b$ are independently hydrogen, an organic group, a heteroorganic group, or a combination thereof, with the proviso that at least one of $R^a$ and $R^b$ is an organic or heteroorganic group; and X is as defined above. Suitable organic and heteroorganic groups include alkyl, alkenyl, cycloalkyl, aryl, aralkyl, alkylsilyl, arylsilyl, alkylamino, arylamino, alkoxy, aryloxy, aralkyloxy, and the like, and combinations thereof (preferably, alkyl, alkenyl, cycloalkyl, aryl, aralkyl, alkoxy, aryloxy, aralkyloxy, and combinations thereof); the groups preferably having from 1 to about 18 carbon atoms (more preferably, 1 to about 12 carbon atoms; even more preferably, 1 to about 8 carbon atoms; most preferably, 1 to about 2 carbon atoms (for example, methyl or vinyl)). The groups can be further substituted with one or more substituent groups such as halogen, alkoxy, amino, carboxyl, hydroxyl, alkoxycarbonyl, nitro, and the like, and combinations thereof.

For example, useful organodihalosilanes include those wherein $R^a$ and $R^b$ are independently hydrogen, a linear, branched, or cyclic alkyl group having fewer than about 9 carbon atoms, a linear, branched, or cyclic heteroalkyl group having fewer than about 7 carbon atoms, a substituted or unsubstituted aryl group having fewer than about 13 carbon atoms, an ethylenically unsaturated group, a ring structure formed from $R^a$ and $R^b$, taken together, having fewer than about 8 carbon atoms, or a combination thereof, with the proviso that at least one of $R^a$ and $R^b$ is a group other than hydrogen; and X is as defined above. Preferably, $R^a$ and $R^b$ are independently selected from hydrogen, alkyl (more preferably, methyl), aryl (more preferably, phenyl), alkenyl (more preferably, vinyl), and combinations thereof, with the proviso that at least one of $R^a$ and $R^b$ is a group other than hydrogen; and/or each X is preferably chlorine.

Bases

Bases that are suitable for use in carrying out the process of the invention include those that can form a base adduct with a halosilane. Useful bases include tertiary amines (for example, trialkylamines such as trimethylamine, triethylamine, tetramethylethylenediamine, and combinations thereof), pyridine, substituted (for example, with one or more substituents such as methyl or ethyl groups) pyridines (for example, picolines), sterically-hindered secondary amines, phosphines (for example, trimethyl phosphine, dimethylethyl phosphine, methyldiethyl phosphine, and combinations thereof), arsines (for example, trimethyl arsine), and the like, and combinations thereof.

Preferred bases include tertiary amines, pyridine, substituted pyridines, and combinations thereof. More preferred bases include tertiary amines, pyridine, picolines, and combinations thereof (even more preferably, tertiary amines, pyridine, and combinations thereof; still more preferably, trimethylamine, pyridine, and combinations thereof). Most preferred is pyridine.

Preparation of Dihalosilane-Base Adduct

The dihalosilane-base adduct can be prepared by combining at least one of the above-described dihalosilanes with at least one of the above-described bases. The dihalosilanes can react with the base to form an adduct, the rate of formation and stability of which can depend on the acidity of the dihalosilane and the basicity of the base. The dihalosilane and the base can be selected so as to produce an adduct that is sufficiently stable to function as a reaction intermediate that is capable of reacting with ammonia or a primary amine. In particular, one mole of dichlorosilane is known to react with two moles of pyridine to form a 1:2 (halide:base) adduct or with one mole of tetramethylethylenediamine to form a 1:1 adduct (as described, for example, by H. J. Campbell-Ferguson and E. A. V. Ebsworth in J. Chem. Soc. (A), 1966, 1508, the adduct descriptions of which are incorporated herein by reference; according to Campbell-Ferguson and Ebsworth, replacing hydrogen with methyl (to form organodihalosilane) weakens the acceptor power of the silicon atom, leading to diminished adduct formation and/or diminished adduct stability relative to the corresponding dihalosilane).

For example, at least one dihalosilane (for example, dichlorosilane), at least one base (for example, pyridine), and, optionally, at least one aprotic solvent (for example, hexane) can be combined in essentially any order in any suitable reactor (for example, a round bottom flask equipped with a magnetic stir bar, a reflux condenser, and a gas inlet), which can then be stirred and heated to a desired reaction temperature (for example, about 23° C. to about 100° C.) under a dry (for example, nitrogen) atmosphere.

In forming the dihalosilane-base adduct, the base can be used in an amount that is less than or equal to about twice the stoichiometric amount of silicon-halogen bonds in the dihalosilane. Thus, for a monobasic compound such as pyridine (for which the stoichiometric amount of base is 2 moles of base for every mole of dihalosilane) less than or equal to about 4 moles of base can be used per mole of dihalosilane. For a dibasic compound such as tetramethylethylenediamine (for which the stoichiometric amount of base is 1 mole of base for every mole of dihalosilane), less than or equal to about 2 moles of base can be used per mole of dihalosilane.

The base is preferably used for the dihalosilane-base adduct formation in an amount that is at least equal to the stoichiometric amount of silicon-halogen bonds in the dihalosilane but less than or equal to twice this amount. Preferably, the amount of base is less than or equal to about 1.5 times the stoichiometric amount of silicon-halogen bonds in the dihalosilane (more preferably, less than or equal to about 1.25 times the stoichiometric amount; most preferably, about equal to the stoichiometric amount).

Suitable solvents for use in the process of the invention, if desired, include aprotic solvents such as aromatic solvents (for example, xylene, benzene, 1,2-dichlorobenzene, 1,3-dichlorobenzene, 1,4-dichlorobenzene, and the like, and mixtures thereof), alkanes (for example, hexane, heptane, isoparaffinic hydrocarbons, and the like, and mixtures thereof), and the like, and mixtures thereof. Preferred solvents include xylene, hexane, heptane, and mixtures thereof, with xylene, hexane, and mixtures thereof being more preferred and hexane being most preferred.

Ammonolysis

After formation of the dihalosilane-base adduct, the resulting product (preferably, solvent has been used for the adduct formation step or has been subsequently added to form a slurry) can optionally be stirred (for example, at room temperature for about one hour) prior to addition of a stoichiometric excess of ammonia (for example, by bubbling through the slurry at room temperature), a primary amine, or a combination thereof (preferably, ammonia). The temperature of the resulting reaction mixture generally rises as ammonolysis proceeds, and ammonia (or amine) can generally be added to the reaction mixture until the temperature of the reaction mixture begins to drop (which can indicate that sufficient ammonia has been added to enable the reaction to run to completion). The ammonolysis reaction is preferably carried out in an inert gas atmosphere (for example, under nitrogen or argon).

Base can be present during the ammonolysis in only a limited amount, wherein the total amount of reacted and unreacted base resulting from adduct formation is less than or equal to about twice the stoichiometric amount of silicon-halogen bonds in the dihalosilane (a "limited amount of base"). This can be achieved either by using only this limited amount of base to form the dihalosilane-base adduct, or by subsequently removing a sufficient amount of unreacted base prior to ammonolysis to reduce the total amount of reacted and unreacted base to this limited amount (for example, by evaporation of a relatively volatile base such as trimethylamine (boiling point of about 3° C.)).

Ammonolysis of the dihalosilane-base adduct can provide curable perhydropolysilazane. When a curable copolysilazane is desired, at least one dihalosilane-base adduct and at least one of the above-described organodihalosilanes can be combined prior to ammonolysis. Such combining (and the subsequent ammonolysis) preferably can be carried out in the presence of no more than the above-defined limited amount of base. Thus, excess (as defined above) base preferably can be removed prior to addition of the organodihalosilane.

After the ammonolysis reaction has run to completion, the reactor can be cooled and vented, and the reactor contents can be removed and optionally further purified. For example, salt by-products can be removed by filtration, and solvent can be removed by evaporation.

Curable Polysilazanes

The curable polysilazanes prepared by the process of the invention are generally viscous liquids (for example, having initial viscosities of about $1 \times 10^{-3}$ Pa·s to about $500 \times 10^{-3}$ Pa·s). The curable polysilazanes include those having linear, branched, or cyclic structures, or a combination thereof. The copolysilazanes can have random, alternating, or block polymer structures, or a combination thereof. Optionally, modified polysilazanes (for example, polymetallosilazanes, polysiloxazanes, polyureasilazanes, and the like, and combinations thereof) can be prepared by using known methods.

If desired, the curable polysilazanes can be converted to curable organofluorine-modified polysilazanes by reaction with one or more fluorochemical compounds including those that comprise (a) at least one organofluorine or heteroorganofluorine moiety and (b) at least one functional group that is capable of reacting with an above-described curable oligomeric or polymeric polysilazane through at least one of its chemically reactive sites (selected from silicon-nitrogen bonds, silicon-hydrogen bonds, carbon-carbon double bonds, nitrogen-hydrogen bonds, and combinations thereof). Preferably, the organofluorine or heteroorganofluorine moiety of the fluorochemical compound is a perfluorinated moiety (more preferably, a perfluoroalkyl, perfluoroalkylene, perfluoroheteroalkyl, or perfluoroheteroalkylene moiety).

A class of useful fluorochemical compounds includes those that can be represented by the following general formula:

wherein $R_f$ is a monovalent or multivalent (preferably, monovalent or divalent) linear, branched, alicyclic, or aromatic, fluorinated or perfluorinated, organic or heteroorganic group or a combination thereof (preferably, a perfluorinated organic or heteroorganic group or a combination thereof; more preferably, a perfluoroalkyl, perfluoroalkylene, perfluoroether, or perfluoropolyether group or a combination thereof; even more preferably, a perfluoroalkyl, perfluoroalkylene, or perfluoropolyether group or a combination thereof; most preferably, a perfluoropolyether group); each Y is independently a covalent bond or a divalent linear, branched, alicyclic, or aromatic, organic or heteroorganic linking group or a combination thereof (preferably, a covalent bond or an alkylene or heteroalkylene group or a combination thereof; more preferably, a covalent bond, an alkylene group that optionally contains at least one catenated oxygen atom, a sulfonamido group, or a combination thereof); each X is independently an electrophilic or nucleophilic group (preferably, selected from isocyanato, isothiocyanato, epoxide, amino, oxazolino, hydroxyl, mercapto, vinyl, and hydrolyzable silyl groups (for example, silyl groups comprising at least one hydrolyzable moiety such as alkoxy or acyloxy), and combinations thereof; more preferably, selected from isocyanato, epoxide, amino, oxazolino, hydroxyl, and hydrolyzable silyl groups, and combinations thereof; most preferably, isocyanato, epoxide, amino, oxazolino, hydroxyl, and combinations thereof); and v is a positive integer that equals the valency of $R_f$ (preferably, one or two). Preferably, $R_f$ (which can be saturated or unsaturated; preferably, saturated) contains from about 3 to about 35 carbon atoms (more preferably, from about 4 to about 25 carbon atoms; most preferably, from about 6 to about 18 or 20 carbon atoms), and/or Y (which can be saturated or unsaturated; preferably, saturated) contains from about 0 to about 12 carbon atoms (more preferably, from about 1 to about 6 carbon atoms; most preferably, from about 1 to about 3 carbon atoms).

Particularly preferred curable polysilazanes that can be prepared by the process of the invention include those that can be prepared from starting silanes (as described above) in which each non-halogen substituent is independently selected from hydrogen, alkyl (preferably, methyl), alkenyl (preferably, vinyl), aryl (preferably, phenyl), and combinations thereof (preferably, at least one of the non-halogen substituents is hydrogen). Such preferred curable polysilazanes include perhydropolysilazane (homopolymer comprising H—H type units, as defined below) and copolysilazanes comprising H—H type units and at least one of the other types of units shown below:

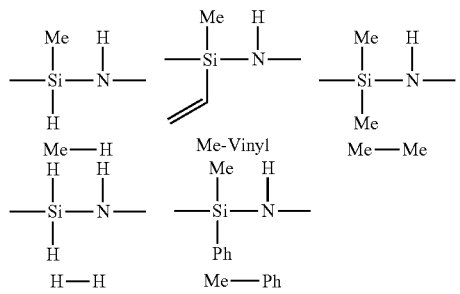

wherein Me is methyl and Ph is phenyl, as well as Vinyl-H units (that is, Me-H units wherein methyl is replaced with vinyl). Some of the units of the perhydropolysilazane or the copolysilazane can become modified (for example, by replacement of the nitrogen-hydrogen bond with a nitrogen-silicon bond) as the reaction advances, so as to introduce a degree of branching into the resulting curable polysilazane.

The nature and amount of each type of unit can vary widely in the copolysilazanes, depending upon the particular application, the desired properties, and the preferred curing method. For example, preferred copolysilazanes can comprise Me-H and H—H units (for example, in a mole ratio of about 30 parts of Me-H to about 70 parts of H—H or about 50 parts of Me-H to about 50 parts of H—H); Me-H, Me-Vinyl, and H—H units (for example, in a mole ratio of about 50 parts of Me-H to about 20 parts of Me-Vinyl to about 30 parts of H—H); or Me-Me and H—H units (for example, in a mole ratio of about 10 parts of Me-H to about 90 parts of H—H).

Use and Curing of Curable Polysilazanes

The curable polysilazanes prepared by the process of the invention can have relatively long shelf lives, even when stored in neat (or 100 percent solids) form. The curable polysilazanes can be in the form of relatively viscous liquids that can be used alone or that can be used in admixture with each other, with one or more other types of polymers, and/or with commonly-used solvents (for example, alkyl esters, ketones, ethers, alkanes, aromatics, and the like, and mixtures thereof).

Minor amounts of optional components can be added to the curable polysilazanes to impart particular desired properties for particular curing methods or uses. Useful compositions can comprise conventional additives such as, for example, catalysts, initiators, surfactants, stabilizers, anti-oxidants, flame retardants, and the like, and mixtures thereof.

The curable polysilazanes (or a composition comprising, consisting, or consisting essentially thereof) can be used in various applications. For example, the curable polysilazanes can be used in molding applications (optionally in combination with at least one filler) to form various shaped articles, as ceramic precursors, and in coating applications (for example, to form hardcoats). When organofluorine-modified, the curable polysilazanes can serve as fluorinated surface treatments to impart a degree of hydrophobicity and/or oleophobicity to a variety of substrates (for example, for surface protection or to enhance ease of cleaning).

The curable polysilazanes (or a composition comprising, consisting, or consisting essentially thereof) can be cured by exposure to moisture (for example, through their H—H content, as described above), by the use of free radical initiators (for example, through their Me-Vinyl, Me-H, or H—H content, as described above), by the use of hydrosilation catalysts such as platinum catalysts (for example, through their Me-Vinyl, Me-H, or H—H content, as described above), or the like. The preferred curing method will vary, depending upon the particular application and its accompanying requirements and conditions.

Moisture cure can be effected at temperatures ranging from room temperature (for example, about 23° C.) up to about 80° C. or more, depending upon the degree of H—H content. Moisture curing times can range from a few minutes (for example, at the higher temperatures) to hours (for example, at the lower temperatures).

Useful moisture curing catalysts are well-known in the art and include ammonia, N-heterocyclic compounds (for example, 1-methylpiperazine, 1-methylpiperidine, 4,4'-trimethylenedipiperidine, 4,4'-trimethylene-bis(1-methylpiperidine), diazobicyclo[2.2.2]octane, cis-2,6-dimethylpiperazine, and the like, and combinations thereof), mono-, di-, and trialkylamines (for example, methylamine, dimethylamine, trimethylamine, phenylamine, diphenylamine, triphenylamine, DBU (that is, 1,8-diazabicyclo[5.4.0]-7-undecene), DBN (that is, 1,5-diazabicyclo[4.3.0]-5-nonene), 1,5,9-triazacyclododecane, 1,4,7-triazacyclononane, and the like, and combinations thereof), organic or inorganic acids (for example, acetic acid, propionic acid, butyric acid, valeric acid, maleic acid, stearic acid, hydrochloric acid, nitric acid, sulfuric acid, phosphoric acid, chloric acid, hypochlorous acid, and the like, and combinations thereof), metal carboxylates, metal acetylacetonate complexes, metal powders, peroxides, metal chlorides, organometallic compounds, and the like, and combinations thereof. Preferred moisture curing catalysts include ammonia, DBU, 4,4'-trimethylene-bis(1-methylpiperidine), and combinations thereof.

When used, the moisture curing catalysts can be present in amounts ranging from about 0.1 to about 10 weight percent (preferably, from about 0.1 to about 5 weight percent; more preferably, from about 0.1 to about 2 weight percent), based upon the total weight of catalyst and curable polysilazane. The catalysts can be added before, during, or after shelf storage (preferably, after) and can be activated at low temperatures (for example, to enable room temperature curing, as described above).

Suitable free radical initiators include organic and inorganic peroxides; alkali metal persulfates; ammonium persulfate; redox systems; aliphatic azo compounds; organic and inorganic peroxides in combination with metal or amine compounds as activators; and the like, and combinations thereof. Preferred free radical initiators include organic and inorganic peroxides (for example, hydrogen peroxide and acyl or aryl peroxides such as p-menthane hydroperoxide, ethyl ketone peroxide, benzoyl peroxide, lauroyl peroxide, tert-butyl peroxybenzoate, acetyl benzyl peroxide, p-chlorobenzoyl peroxide, alkoxy benzoyl peroxide, dicaproyl peroxide, crotonyl peroxide, di-tert-alkyl peroxide, di-tertbutyl diphosphate peroxide, peracetic acid, cyclohexyl hydroperoxide, dicumyl peroxide, and the like, and combinations thereof); and combinations thereof.

When used, the free radical initiators can be present in amounts ranging from about 0.1 to about 10 weight percent (preferably, from about 1 to about 5 weight percent), based upon the total weight of initiator and curable polysilazane. The free radical initiators can be added before, during, or after shelf storage (preferably, after) and can be activated by the heat of their reaction (in some cases) or by radiation or thermal energy from an external source (for example, convection heating, induction heating, or electron beam or microwave irradiation). For example, free radically-initiated curing can be effected by heating to a temperature of about 150° C. for a period of minutes to hours (for example, about 18 hours).

Suitable hydrosilation catalysts include thermal catalysts (for example, platinum catalysts) and photocatalysts that can be effective for catalyzing a hydrosilation reaction between silicon-bonded hydrogen groups and silicon-bonded ethylenic groups. Useful thermal hydrosilation catalysts include those described, for example, in U.S. Pat. No. 2,823,218 (Speier et al.); U.S. Pat. No. 2,970,150 (Bailey); U.S. Pat. No. 3,159,601 and U.S. Pat. No. 3,159,662 (Ashby); U.S. Pat. No. 3,220,972 (Lamoreaux); U.S. Pat. No. 3,516,946 (Modic); U.S. Pat. No. 3,814,730 (Karstedt); U.S. Pat. No. 4,029,629 (Jeram); U.S. Pat. No. 4,533,575 and U.S. Pat. No. 4,504,645 (Melancon); and U.S. Pat. No. 5,741,552 (Takayama, et al.); the catalyst descriptions of which are incorporated herein by reference. Useful photocatalysts include those described, for example, in U.S. Pat. Nos. 4,510,094 and 4,530,879 (Drahnak); and U.S. Pat. No. 5,145,886 (Oxman et al.); the catalyst descriptions of which are incorporated herein by reference. Useful hydrosilation catalysts and techniques also include those described in U.S. Pat. No. 5,520,978 (Boardman et al.); the hydrosilation catalyst and technique descriptions of which are incorporated herein by reference. Combinations of thermal catalysts and photocatalysts can be used.

When used, the hydrosilation catalyst can typically be present in an amount that is effective to catalyze the hydrosilation reaction (for example, in amounts ranging from about 1 to about 1000 parts per million (ppm); preferably, from about 10 to about 500 ppm; more preferably, from about 50 to about 250 ppm), based upon the total weight of catalyst and curable polysilazane. The catalyst can be added before, during, or after shelf storage (preferably, after) and can be activated by the heat of their reaction (in some cases) or by radiation (for example, ultraviolet-visible light, gamma irradiation, e-beam, or the like) or thermal energy from an external source (for example, convection heating, induction heating, irradiation, or the like). For example, platinum catalyzed curing can be effected by heating to a temperature of about 120° C. for a period of about seconds to minutes.

The curable polysilazanes can be cured to form crosslinked hardcoats. The hardcoats can exhibit hybrid properties that can be tailored by varying the degree of crosslinking and by varying the natures and relative amounts of the starting silane(s).

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

All parts, percentages, ratios, etc. in the examples and the rest of the specification are by weight, unless noted otherwise. Solvents and other reagents used were obtained from Aldrich Chemical Company, Milwaukee, Wis. unless otherwise noted.

Materials

Hexane was obtained from Aldrich Chemical Company, Milwaukee, Wis.

Anhydrous pyridine was obtained from Aldrich Chemical Company, Milwaukee, Wis.

Dichlorosilane (25 weight percent in xylene) was obtained from Gelest, Inc., Morrisville, Pa.

Methyldichlorosilane was obtained from Aldrich Chemical Company, Milwaukee, Wis.

Methyl vinyl dichlorosilane was obtained from Aldrich Chemical Company, Milwaukee, Wis.

Ammonia was obtained from Aldrich Chemical Company, Milwaukee, Wis.

Xylene was aobtained fom Alfa Aesar, Ward Hill, Mass.,

Me$_3$N was obtained from Aldrich Chemical Company, Milwaukee, Wis.

Heptane was obtained from Aldrich Chemical Company, Milwaukee, Wis.

4,4'-Trimethylenebis(1-methylpiperidine) was obtained from Aldrich Chemical Company, Milwaukee, Wis.

Example 1 and Comparative Example A

Preparation of

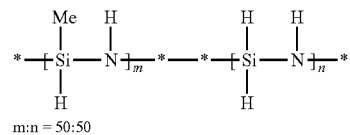

m:n = 50:50

For Example 1, a 1-liter, three-necked flask equipped with a mechanical stirrer, a dry ice/acetone condenser, and an ammonia inlet tube was charged with hexane (300 mL) and dichlorosilane (25 weight percent in xylene, 0.16 mole, 64.6 g). Anhydrous pyridine (0.32 mole, 99.5 percent purity, 25.4 g, equal to the stoichiometric amount of silicon-chlorine bonds in the dichlorosilane) was added dropwise to the flask. White solid pyridine adduct was produced. The resulting slurry was stirred at room temperature for one hour. Methyldichlorosilane (0.16 mole, 18.4 g) was then added to the slurry, and ammonia was then slowly bubbled into the flask. The temperature of the resulting reaction mixture increased. The reaction continued until 56 g of ammonia had been added. The resulting byproduct salt was filtered off Evaporation of solvent from the resulting filtrate (using an oil bath set at 55° C. and 668.7 Pa (0.0066 atmosphere) vacuum) gave 10.0 g of viscous copolysilazane (yield of 68.7 percent). The viscosity (measured using a Brookfield Model DV-III programmable rheometer obtained from Brookfield Engineering Laboratories, Inc., Middleboro, Mass.) of the copolysilazane was 61.9×10$^{-3}$ Pa·s (61.9 cP) at 25° C. After one month of aging under ambient conditions, the viscosity increased to 103.6×10$^{-3}$ Pa·s (103.6 cP) at 25° C.

For Comparative Example A, a 1-liter, three-necked flask equipped with a mechanical stirrer, a dry ice/acetone condenser, and an ammonia inlet tube was charged with dichlorosilane (25 weight percent in xylene, 0.08 mole, 32.4 g) and methyldichlorosilane (0.08 mole, 9.2 g). A large excess of anhydrous pyridine (150 mL, 1.86 mole, 11.63 times the stoichiometric amount of silicon-chlorine bonds in the dichlorosilane) was added dropwise to the flask. White solid pyridine adduct was produced. The resulting slurry was stirred at room temperature for one hour. Ammonia was then slowly bubbled into the flask. The temperature of the resulting reaction mixture increased. The reaction continued until 28 g of ammonia had been added. The resulting byproduct salt was filtered off. Evaporation of solvent from the resulting filtrate (using an oil bath set at 55° C. and 668.7 Pa (0.0066 atmosphere) vacuum) gave 4.8 g of viscous copolysilazane (yield of 66 percent). The viscosity of the copolysilazane (measured essentially as described above) was $1176 \times 10^{-3}$ Pa·s (1176 cP) at 25° C. After one month of aging under ambient conditions, the viscosity increased to $4549 \times 10^{-3}$ Pa·s (4549 cP) at 25° C.

Example 2 and Comparative Example B

Preparation of

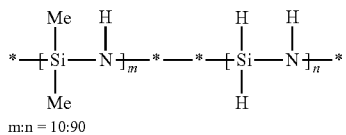

m:n = 10:90

For Example 2, a 3-liter, three-necked flask equipped with a mechanical stirrer, a dry ice/acetone condenser, and an ammonia inlet tube was charged with hexane (1500 mL) and anhydrous pyridine (1.98 mole, 156.6 g, equal to the stoichiometric amount of silicon-chlorine bonds in the dichlorosilane). Dichlorosilane (25 weight percent in xylene, 0.99 mole, 400 g) was added dropwise to the flask. White solid pyridine adduct was produced and precipitated out. The resulting slurry was stirred at room temperature for one hour. Dimethyldichlorosilane (0.099 mole, 12.77 g) was then added to the slurry, and ammonia was then slowly bubbled into the flask. The temperature of the resulting reaction mixture increased. The reaction continued until 67 g of ammonia had been added. The resulting byproduct salt was filtered off. Evaporation of solvent from the resulting filtrate (using an oil bath set at 55° C. and 668.7 Pa (0.0066 atmosphere) vacuum) gave 30 g of viscous copolysilazane (yield of 58 percent). The viscosity of the copolysilazane (determined essentially as described above) was $24.06 \times 10^{-3}$ Pa·s (24.06 cP) at 25° C. The copolysilazane did not gel upon aging under ambient conditions for six months.

For Comparative Example B, a 1-liter, three-necked flask equipped with a mechanical stirrer, a dry ice/acetone condenser, and an ammonia inlet tube was charged with dichlorosilane (25 weight percent in xylene, 0.3 mole, 121.2 g) and dimethyldichlorosilane (0.03 mole, 3.87 g). 500 mL (6.19 mole, 10.3 times the stoichiometric amount of silicon-chlorine bonds in the dichlorosilane) anhydrous pyridine was added dropwise to the flask. White solid pyridine adduct was produced and precipitated out. The resulting slurry was stirred at room temperature for one hour. Ammonia was then slowly bubbled into the flask. The temperature of the resulting reaction mixture increased. The reaction continued until 50 g of ammonia had been added. The resulting byproduct salt was filtered off Evaporation of solvent from the resulting filtrate (using an oil bath set at 55° C. and 668.7 Pa (0.0066 atmosphere) vacuum) gave 9.5 g of viscous copolysilazane (yield of 61 percent). The viscosity of the copolysilazane (determined essentially as described above) was $3886 \times 10^{-3}$ Pa·s (3886 cP) at 25° C. The copolysilazane solidified upon aging for two-days under ambient conditions.

Example 3

Preparation of

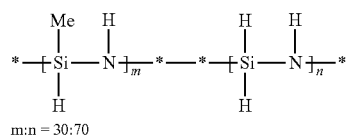

m:n = 30:70

A 2-liter, three-necked flask equipped with a mechanical stirrer, a dry ice/acetone condenser, and an ammonia inlet tube was charged with hexane (800 mL) and anhydrous pyridine (0.84 mole, 66.4 g, equal to the stoichiometric amount of silicon-chlorine bonds in the dichlorosilane). Dichlorosilane (25 weight percent in xylene, 0.42 mole, 169.7 g) was added dropwise to the flask. White, solid pyridine adduct was produced and precipitated out. The resulting slurry was stirred at room temperature for one hour. Methyldichlorosilane (0.18 mole, 20.7 g) was then added to the slurry, and ammonia was then slowly bubbled into the flask. The temperature of the resulting reaction mixture increased. The reaction continued until 35 g of ammonia had been added. The resulting byproduct salt was filtered off. Evaporation of solvent from the resulting filtrate gave 16.9 g of viscous copolysilazane (yield of 68.7 percent).

Example 4

Preparation of

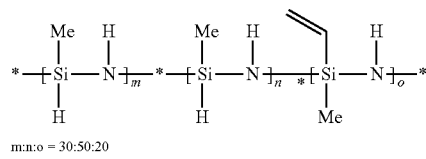

m:n:o = 30:50:20

A 3-liter, three-necked flask equipped with a mechanical stirrer, a dry ice/acetone condenser, and an ammonia inlet tube was charged with hexane (1250 mL) and anhydrous pyridine (0.6 mole, 47.5 g, equal to the stoichiometric amount of silicon-chlorine bonds in the dichlorosilane). Dichlorosilane (25 weight percent in xylene, 0.3 mole, 121.2 g) was added dropwise to the flask. White solid pyridine adduct was produced and precipitated out. The resulting slurry was stirred at room temperature for one hour. Methyldichlorosilane (0.5 mole, 57.5 g) and methyl vinyl dichlorosilane (0.2 mole, 28.2 g) were added to the slurry, and then ammonia was slowly bubbled into the flask. The temperature of the resulting reaction mixture increased. The reaction continued until 65 g of ammonia had been added. The resulting byproduct salt was filtered off Evaporation of solvent from the resulting filtrate gave 63 g of viscous copolysilazane.

Example 5-6 and Comparative Example C-D

Preparation of

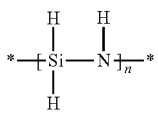

For Example 5, a 1-liter, three-necked flask equipped with a mechanical stirrer, a dry ice/acetone condenser, and an ammonia inlet tube was charged with dichlorosilane (25 weight percent in xylene, 0.35 mole, 141.4 g) and 500 mL hexane. Anhydrous pyridine (0.7 mole, 55.4 g, equal to the stoichiometric amount of silicon-chlorine bonds in the dichlorosilane) was added dropwise to the flask over a period of 1 hour. White solid pyridine adduct was produced. The resulting slurry was stirred at room temperature for one hour. Ammonia was then slowly bubbled into the flask. The temperature of the resulting reaction mixture increased. The reaction continued until 57 g of ammonia had been added. The resulting byproduct salt was filtered off. Evaporation of solvent (using an oil bath set at 55° C. and 668.7 Pa (0.0066 atmosphere) vacuum) gave 3.1 g of viscous perhydropolysilazane (yield of 20 percent, possibly due to loss (distilling out) of some low molecular weight fractions during solvent removal). The perhydropolysilazane solidified after seven days of aging under ambient conditions.

For Example 6, a 1-liter, three-necked flask equipped with a mechanical stirrer, a dry ice/acetone condenser, and an ammonia inlet tube was charged with dichlorosilane (25 weight percent in xylene, 0.35 mole, 141.4 g) and 500 mL hexane. Anhydrous pyridine (1.4 moles, 110.8 g, equal to twice the stoichiometric amount of silicon-chlorine bonds in the dichlorosilane) was added dropwise to the flask over a period of 1 hour. White solid pyridine adduct was produced. The resulting slurry was stirred at room temperature for one hour. Ammonia was then slowly bubbled into the flask. The temperature of the resulting reaction mixture increased. The reaction continued until 57 g of ammonia had been added. The resulting byproduct salt was filtered off. Evaporation of solvent (using an oil bath set at 55° C. and 668.7 Pa (0.0066 atmosphere) vacuum) gave 4.7 g viscous perhydropolysilazane (yield of 30 percent, possibly due to loss (distilling out) of some low molecular weight fractions during solvent removal). The perhydropolysilazane solidified after three days of aging under ambient conditions.

For Comparative Example C, a 1-liter, three-necked flask equipped with a mechanical stirrer, a dry ice/acetone condenser, and an ammonia inlet tube was charged with dichlorosilane (25 weight percent in xylene, 1 mole, 400 g). 1500 mL (18.6 mole, 1469 g, 9.3 times the stoichiometric amount of silicon-chlorine bonds in the dichlorosilane) anhydrous pyridine was added dropwise to the flask. White solid pyridine adduct was produced and precipitated out. The resulting slurry was stirred at room temperature for one hour. Ammonia was then slowly bubbled into the flask. The temperature of the resulting reaction mixture increased. The reaction continued until 100 g of ammonia had been added. The resulting byproduct salt was filtered off. Evaporation of solvent (using an oil bath set at 55° C. and 668.7 Pa (0.0066 atmosphere) vacuum) gave 42 g of viscous perhydropolysilazane (yield of 94 percent). The perhydropolysilazane solidified overnight upon aging under ambient conditions.

For Comparative Example D, a 1-liter three-necked flask equipped with a mechanical stirrer, a dry ice/acetone condenser, and an ammonia inlet tube was charged with dichlorosilane (25 weight percent in xylene, 1 mole, 400 g). Ammonia was then slowly bubbled into the flask. The temperature of the resulting reaction mixture increased. The reaction continued until 100 g of ammonia had been added. The resulting byproduct salt was filtered off. Evaporation of solvent (using an oil bath set at 55° C. and 668.7 Pa (0.0066 atmosphere) vacuum) gave 0 g of polymer.

Example 7

Preparation of

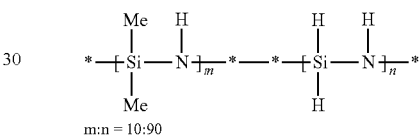

m:n = 10:90

A 1-liter, three-necked flask equipped with a mechanical stirrer, a dry ice/acetone condenser, and an ammonia inlet tube was charged with dichlorosilane (25 weight percent in xylene, 0.3 mole, 121.2 g) and 500 mL hexane. Then, trimethylamine (160 g, 2.71 moles) was added to the flask. White solid trimethylamine adduct was produced. After 1 hour, the dry ice/acetone condenser was removed and essentially all unreacted trimethylamine was allowed to evaporate over a period of two hours. Dimethyldichlorosilane (0.03 mole, 3.87 g) was then added to the flask. The resulting slurry was stirred at room temperature for one hour. Ammonia was then slowly bubbled into the flask. The temperature of the resulting reaction mixture increased. The reaction continued until 67 g of ammonia had been added. The resulting byproduct salt was filtered off. Evaporation of solvent (using an oil bath set at 55° C. and 668.7 Pa (0.0066 atmosphere) vacuum) gave 6.8 g of viscous copolysilazane (yield of 44 percent). The viscosity of the copolysilazane (measured essentially as described above) was $78.46 \times 10^{-3}$ Pa·s (78.46 cP) at 25° C. The copolysilazane did not gel upon aging for two weeks under ambient conditions.

TABLE 1

Summary of Examples 1-7 and Comparative Examples A-D.

| Example Number | SiH$_2$Cl$_2$ (moles) | RR'SiCl$_2$ R Group | RR'SiCl$_2$ R' Group | RR'SiCl$_2$ Amount (moles) | Base | Initial Amount of Base (moles) | Yield (percent) | Viscosity of Polysilazane at 25° C. (×10$^{-3}$ Pa·s) | Time to Gel (days) |
|---|---|---|---|---|---|---|---|---|---|
| 1 | 0.165 | Me | H | 0.165 | Pyridine | 0.33 | 69 | 62 | >>30 |
| C-A | 0.082 | Me | H | 0.082 | Pyridine | 22.5 | 66 | 1176 | >30 |

TABLE 1-continued

Summary of Examples 1-7 and Comparative Examples A-D.

| Example Number | $SiH_2Cl_2$ (moles) | RR'SiCl$_2$ R Group | R' Group | Amount (moles) | Base | Initial Amount of Base (moles) | Yield (percent) | Viscosity of Polysilazane at 25° C. ($\times 10^{-3}$ Pa·s) | Time to Gel (days) |
|---|---|---|---|---|---|---|---|---|---|
| 2 | 0.99 | Me | H | 0.099 | Pyridine | 1.98 | 58 | 24 | >180 |
| C-B | 0.3 | Me | H | 0.03 | Pyridine | 6.19 | 61 | 3886 | 2 |
| 3 | 0.42 | Me | H | 0.18 | Pyridine | 0.84 | 69 | Viscous | — |
| 4 | 0.3 | Me; Me | H; Vinyl | 0.5; 0.2 | Pyridine | 0.6 | 100 | Viscous | — |
| 5 | 0.35 | — | — | 0 | Pyridine | 0.7 | 20 | Viscous | 7 |
| 6 | 0.35 | — | — | 0 | Pyridine | 1.4 | 30 | — | 3 |
| C-C | 1.0 | — | — | 0 | Pyridine | 18.6 | 94 | Viscous | 1 |
| C-D | 1.0 | — | — | 0 | Pyridine | 0 | 0 | — | — |
| 7 | 0.3 | Me | H | 0.03 | Me$_3$N | 2.7 | 44 | 78 | >14 |

Examples 8 and 9 and Comparative Example E

Cured coatings were prepared from the copolysilazanes of Examples 2 and 3 (as Examples 8 and 9, respectively). Coating solutions of copolysilazane in heptane (and containing 4,4'-trimethylenebis(1-methylpiperidine) as a curing catalyst) were prepared and coated on polycarbonate substrates using a #12 wire. The actual amounts of the copolysilazane, heptane, and 4,4'-trimethylenebis(1-methylpiperidine) were adjusted as indicated below in Table 2, to obtain coating solutions of similar viscosities and thus similar thicknesses. The resulting coatings were then dried and cured at 60° C. at a relative humidity of 95 percent for 12 hours.

The hardnesses of the resulting cured coatings (as well as the hardness of an uncoated polycarbonate substrate, as Comparative Example E) were measured using a nanoindenter (Nanoindenter XP with a Dynamic Contact Module, obtained from MTS Nano Instruments, Oak Ridge, Tenn.). The hardness (H) of each coating was determined using nanoindentations at depth regimes of 100-150 nm to minimize substrate effects. The resulting data is shown in Table 2 below.

TABLE 2

Hardness of Cured Copolysilazanes.

| | Coating Composition | | | |
|---|---|---|---|---|
| Example Number | Amount of Copolysilazane (g) | Amount of Heptane (g) | Amount of Curing Catalyst (g) | Hardness (GPa) |
| 8 | 1.05 | 9.6 | 0.032 | 1.65 |
| 9 | 1.05 | 4 | 0.014 | 1.2 |
| C-E | — | — | — | 0.25 |

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows.

We claim:

1. A process for preparing curable oligomeric and/or polymeric polysilazanes comprising
    (a) forming at least one dihalosilane-base adduct by reacting at least one dihalosilane with at least one base;
    (b) combining at least one said dihalosilane-base adduct and at least one organodihalosilane; and
    (c) carrying out ammonolysis of the resulting combination of at least one said dihalosilane-base adduct and at least one said organodihalosilane;
with the proviso that said base (1) is used for said dihalosilane-base adduct formation in a limited amount that is less than or equal to 1.25 times the stoichiometric amount of silicon-halogen bonds in said dihalosilane or (2) is used for said dihalosilane-base adduct formation in excess of said limited amount and, prior to said ammonolysis, the total amount of the resulting reacted and unreacted base is reduced to no more than said limited amount.

2. The process of claim 1, wherein said dihalosilane is selected from those that are represented by the general formula $SiH_2X_2$, wherein each X is independently a halogen atom.

3. The process of claim 1, wherein said dihalosilane is dichlorosilane.

4. The process of claim 1, wherein said base is selected from tertiary amines, pyridine, substituted pyridines, sterically-hindered secondary amines, phosphines, arsines, and combinations thereof.

5. The process of claim 1, wherein said base is selected from trimethylamine, pyridine, and combinations thereof.

6. The process of claim 1, wherein said base is pyridine.

7. The process of claim 1, wherein said limited amount of said base is at least equal to said stoichiometric amount of silicon-halogen bonds in said dihalosilane but less than or equal to 1.25 times said stoichiometric amount.

8. The process of claim 1, wherein said limited amount of said base is equal to said stoichiometric amount of silicon-halogen bonds in said dihalosilane.

9. The process of claim 1, wherein said base is present during said combining in an amount that is less than or equal to said limited amount.

10. The process of claim 1, wherein said organodihalosilane is selected from those that are represented by the general formula $R^a R^b SiX_2$, wherein $R^a$ and $R^b$ are independently hydrogen, an organic group, a heteroorganic group, or a combination thereof, with the proviso that at least one of $R^a$ and $R^b$ is an organic or heteroorganic group; and each X is independently a halogen atom.

11. The process of claim 10, wherein said organic and heteroorganic groups are selected from alkyl, alkenyl, cycloalkyl, aryl, aralkyl, alkylsilyl, arylsilyl, alkylamino, arylamino, alkoxy, aryloxy, aralkyloxy, and combinations thereof.

12. The process of claim 10, wherein said organic and heteroorganic groups have from 1 to 18 carbon atoms.

13. The process of claim 10, wherein said $R^a$ and $R^b$ are independently selected from hydrogen, alkyl, aryl, alkenyl, and combinations thereof; and/or each X is chlorine.

14. The process of claim 13, wherein said $R^a$ and $R^b$ are independently selected from hydrogen, methyl, phenyl, vinyl, and combinations thereof.

15. The process of claim 1, wherein said ammonolysis is carried out by reaction with ammonia.

16. The process of claim 1, wherein said process further comprises reacting at least one resulting curable polysilazane with at least one fluorochemical compound to produce at least one curable organofluorine-modified polysilazane.

17. A curable polysilazane prepared by the process of claim 1.

18. The process of claim 1, wherein said process further comprises at least partially curing said curable polysilazane.

19. An at least partially cured polysilazane prepared by the process of claim 18.

20. A process for preparing curable oligomeric and/or polymeric polysilazanes comprising sequentially
   (a) forming a dichlorosilane-pyridine adduct by reacting dichlorosilane with pyridine, with the proviso that said pyridine is used in an amount that is less than or equal to twice the stoichiometric amount of silicon-halogen bonds in said dichlorosilane;
   (b) combining said dichlorosilane-pyridine adduct and at least one organodichlorosilane; and
   (c) carrying out ammonolysis of the resulting combination of said dichlorosilane-pyridine adduct and at least one said organodichlorosilane.

21. A process for preparing curable oligomeric and/or polymeric polysilazanes comprising sequentially
   (a) forming at least one dihalosilane-base adduct by reacting at least one dihalosilane with at least one base;
   (b) combining at least one said dihalosilane-base adduct and at least one organodihalosilane; and
   (c) carrying out ammonolysis of the resulting combination of at least one said dihalosilane-base adduct and at least one said organodihalosilane;
with the proviso that said base (1) is used for said dihalosilane-base adduct formation in a limited amount that is less than or equal to twice the stoichiometric amount of silicon-halogen bonds in said dihalosilane or (2) is used for said dihalosilane-base adduct formation in excess of said limited amount and, prior to said ammonolysis, the total amount of the resulting reacted and unreacted base is reduced to no more than said limited amount.

* * * * *

UNITED STATES PATENT AND TRADEMARK OFFICE
CERTIFICATE OF CORRECTION

PATENT NO. : 8,802,805 B2  
APPLICATION NO. : 13/515333  
DATED : August 12, 2014  
INVENTOR(S) : Yu Yang Page 1 of 1

It is certified that error appears in the above-identified patent and that said Letters Patent is hereby corrected as shown below:

Title page, Column 2 (Other Publications)
Line 6, Delete "Stoicheiometry"" and insert -- Stoichiometric" --, therefor.

In the Specification

Column 12
Line 24, Delete "aobtained fom" and insert -- obtained from --, therefor.

Column 12
Line 58, Delete "off" and insert -- off. --, therefor.

Column 14
Line 2, Delete "off" and insert -- off. --, therefor.

Column 14
Lines 45-48, Delete

"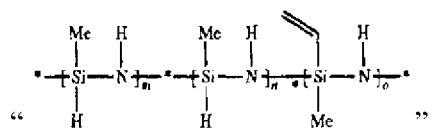"

and insert

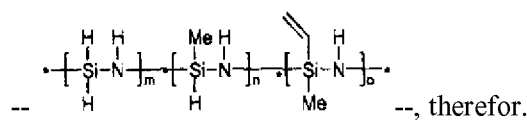 --, therefor.

Column 14
Line 66, Delete "off" and insert -- off. --, therefor.

Signed and Sealed this
Twenty-eighth Day of July, 2015

Michelle K. Lee
*Director of the United States Patent and Trademark Office*